United States Patent [19]

Bilodeau et al.

[11] Patent Number: 5,495,548
[45] Date of Patent: Feb. 27, 1996

[54] PHOTOSENSITIZATION OF OPTICAL FIBER AND SILICA WAVEGUIDES

[75] Inventors: Francois C. Bilodeau, Nepean; Bernard Y. Malo, Gatineau; Jacques Albert, Hull; Derwyn C. Johnson, Nepean; Kenneth O. Hill, Kanata, all of Canada

[73] Assignee: Her Majesty the Queen in Right of Canada, as represented by the Minister of Communications, Ottawa, Canada

[21] Appl. No.: 197,198

[22] Filed: Feb. 16, 1994

Related U.S. Application Data

[63] Continuation-in-part of Ser. No. 18,511, Feb. 17, 1993, abandoned.

[51] Int. Cl.$^6$ ................................................. G02B 6/02
[52] U.S. Cl. ........................ 385/123; 385/124; 385/129; 385/141; 385/37; 65/385; 65/386
[58] Field of Search ................................. 385/129, 130, 385/123, 124, 125.37, 141; 65/3.11, 12.1, 385, 386

[56] References Cited

U.S. PATENT DOCUMENTS

| | | | |
|---|---|---|---|
| 3,966,446 | 6/1976 | Miller | 385/123 X |
| 4,826,288 | 5/1989 | Mansfield et al. | 385/123 |
| 5,066,133 | 11/1991 | Brienza | 385/37 |
| 5,235,659 | 8/1993 | Atkins et al. | 385/124 |
| 5,235,662 | 8/1993 | Prince et al. | 385/129 |
| 5,278,850 | 1/1994 | Ainslie et al. | 385/142 X |

OTHER PUBLICATIONS

Bilodeau et al, "Photosensitization of optical fiber and silica–on–slicon/silica waveguides", Optics Letters, Jun. 1993, vol. 18, No. 12, pp. 953–955.

Simmons et al, "Photosensitivity of solgel–derived germanosilicate planar waveguides", Optics Letters, Jan. 1, 1993, vol. 18, No. 1, pp. 25–27.

Albert et al, "Formation and bleaching of strong ultraviolet absorption bands in germanium implanted synthetic fused silica", Appl. Phys. Lett. 60(2), Jan. 1992, pp. 148–150.

Hill et al, "Efficient mode conversion in telecommunication fibre using externally written gratings", Electronics Letters, Aug. 2, 1990, vol. 26, No. 16, pp. 1270–1272.

Malo et al, "Elimination of photoinduced absorption in Ge–doped silica fibers by annealing of ultraviolet colour centers", Electronics Letters, 28(17), Jun. 1992.

Hill et al, "Birefringent photosensitivity in monomode optical fiber: application to external writing of rocking filters", Electronics Letters, vol. 27, No. 17, Aug. 15, 1991, pp. 1548–1550.

Meltz et al, "Formation of Bragg gratings in optical fibers by a transverse holographic method", Optics Letters, vol. 14, No. 15, Aug. 1, 1989.

*Primary Examiner*—Rodney B. Bovernick
*Assistant Examiner*—Hemang Sanghavi
*Attorney, Agent, or Firm*—Pascal & Associates

[57] ABSTRACT

A method of fabricating a strongly photosensitive optical waveguide is comprised of locally heating at least a portion of a weakly photosensitive optical waveguide for a period of time sufficient to increase the density of defects associated with photosensitivity in the heated portion of the waveguide core.

29 Claims, 3 Drawing Sheets

PHOTOSENSITIZATION OF OPTICAL FIBER AND SILICA WAVEGUIDES

This is a continuation-in-part application of U.S. application Ser. No. 08/018,511 filed Feb. 17th, 1993 now abandoned.

FIELD OF THE INVENTION

This invention relates to optical waveguides and particularly to a method of fabricating a strongly photosensitive waveguide from a weakly photosensitive waveguide.

BACKGROUND TO THE INVENTION

Optical waveguides can exhibit the property of photosensitivity manifest as a permanent, light-induced refractive index change. Initial experiments as described in U.S. Pat. No. 4,474,427 issued Oct. 2nd, 1984, invented by K. O. Hill et al demonstrated the phenomenon in optical fibers but recently it has been detected as well in planar glass structures, including, for example, silica-on-silicon and silica-on-silica planar waveguides.

Photosensitivity can be used to make retroreflecting Bragg gratings, mode convertor gratings and rocking rotators in optical waveguides; to fabricate such devices, a permanent, spatially periodic refractive index modulation is impressed with light along the length of the photosensitive core of the optical waveguide.

Methods of fabricating such Bragg gratings are described in U.S. patent application Ser. No. 969,774, filed Oct. 29th, 1992, invented by K. O. Hill, B. Malo, F. Bilodeau and D. Johnson and entitled METHOD OF FABRICATING BRAGG GRATINGS USING A SILICA GLASS PHASE GRATING MASK.

The near UV absorption spectrum of the Ge-doped core of optical fiber, $Ge:SiO_2$-on-Si or $Ge:SiO_2$-on-$SiO_2$ waveguide is influenced strongly by the type and concentration of in-core defects. It has been found that photosensitivity in Ge-doped core waveguides is linked with absorption due to oxygen vacancy defects in the 240 nm UV region, as described by G. Meltz et al in Optical Letters 14, 823 (1989). High quality optical fiber such as Corning SMF-28 fiber and NTT silica-on-silicon planar guides contain comparatively low concentrations of defects. As a result both types of waveguide are relatively transparent in the near UV and are characterized as being weakly photosensitive.

SUMMARY OF THE PRESENT INVENTION

We have discovered an effective and simple method for augmenting substantially the photosensitivity of weakly photosensitive high silica Ge-doped core optical waveguides to ultraviolet light. Different dopants can result in photosensitivity at different wavelengths. It appears that the method may also work to photosensitize other types of optical waveguide at different wavelengths, for example those doped with cerium or europium and co-doped with alumina, for example.

In contrast to other methods, as described by G. D. Maxwell et al in Electronic Letters 28, 2106 (1992), photosensitization in our case is achieved with a negligible increase in loss at the three principal optical communication windows for typical Bragg retroreflector device lengths. Further, our technique permits localized photosensitization of commercially available high-quality optical waveguides.

In accordance with an embodiment of the invention, a method of fabricating a strongly photosensitive optical waveguide is comprised of locally heating a portion of a weakly photosensitive optical waveguide for a period of time sufficient increase the density of defects in the waveguide to a level required to enhance the waveguide's photosensitive response.

In accordance with another embodiment, a length of weakly photosensitive optical waveguide has a localized section which is significantly photosensitive.

BRIEF INTRODUCTION TO THE DRAWINGS

A better understanding of the invention will be obtained by reference to the detailed description below, in conjunction with the following drawings, in which:

FIG. 1 illustrates an optical fiber being flame brushed,

FIG. 2 is a plot of index change as a function of flame brush processing time as observed in an optical fiber, FIG. 3 curve (a) illustrates the dispersion in absorption coefficient of a Ge-doped slab waveguide layer measured normal to the substrate prior to treatment, FIG. 3 curve (b) illustrates the dispersion in absorption coefficient of the slab waveguide layer after flame brush treatment, FIG. 3 curve (c) illustrates an experimental measurement of the photo-induced change in the dispersion of the absorption coefficient with wavelength for the photosensitized Ge-doped slab waveguide layer caused by UV light irradiation, FIG. 4 illustrates a measurement of the wavelength response of a Bragg grating in the core of a planar three dimensional waveguide after processing in accordance with the present invention, FIG. 5 is a cross-section of a portion of an optical fiber containing a Bragg grating, and FIG. 6 is a cross-section of a fragment of a grating face mask.

DETAILED DESCRIPTION OF THE INVENTION

Figure 1:
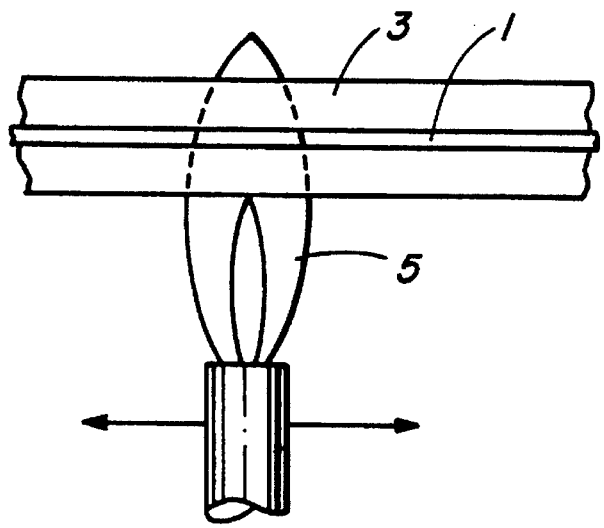

FIG. 1 illustrates a section of waveguide in the form of an optical fiber comprised of core 1 surrounded by cladding 3. A region of the waveguide is immersed in a flame 5, which is brushed "back and forth" repeatedly in a localized region with the flame along the region in the directions shown by the arrows. However, it could be locally heated by some other suitable source of heat such as $CO_2$ laser or an electric arc. Brushing is used to increase the size of the treated region. Otherwise, brushing need not be used.

In a preferred embodiment of the invention, the region of weakly (including negligibly) photosensitive optical waveguide that is to be photosensitized is "brushed" repeatedly by flame 5 fueled by a fuel such as hydrogen or propane but to which a small amount of oxygen is sometimes added (approximate flame temperature is 1700° C.). It has been found that photosensitization typically takes approximately 20 minutes to complete for maximum effect under the conditions used in our experiments (Corning SMF28 fiber waveguide), although we have operated the process successfully using 10 minutes of flame brushing. Because a relatively small flame can be used to "brush" the waveguide, the method provides highly localized photosensitization.

The temperature that the glass of the waveguide is heated is to approximately white heat (approximately the fusion point of glass).

We have used the flame brush method to increase the photosensitivity of standard (Ge-doped core Corning SMF28) telecommunications fiber by a factor greater than ten (photoinduced refractive index charge >$10^{-3}$ at $\lambda$=1530 nm).

Figure 2:
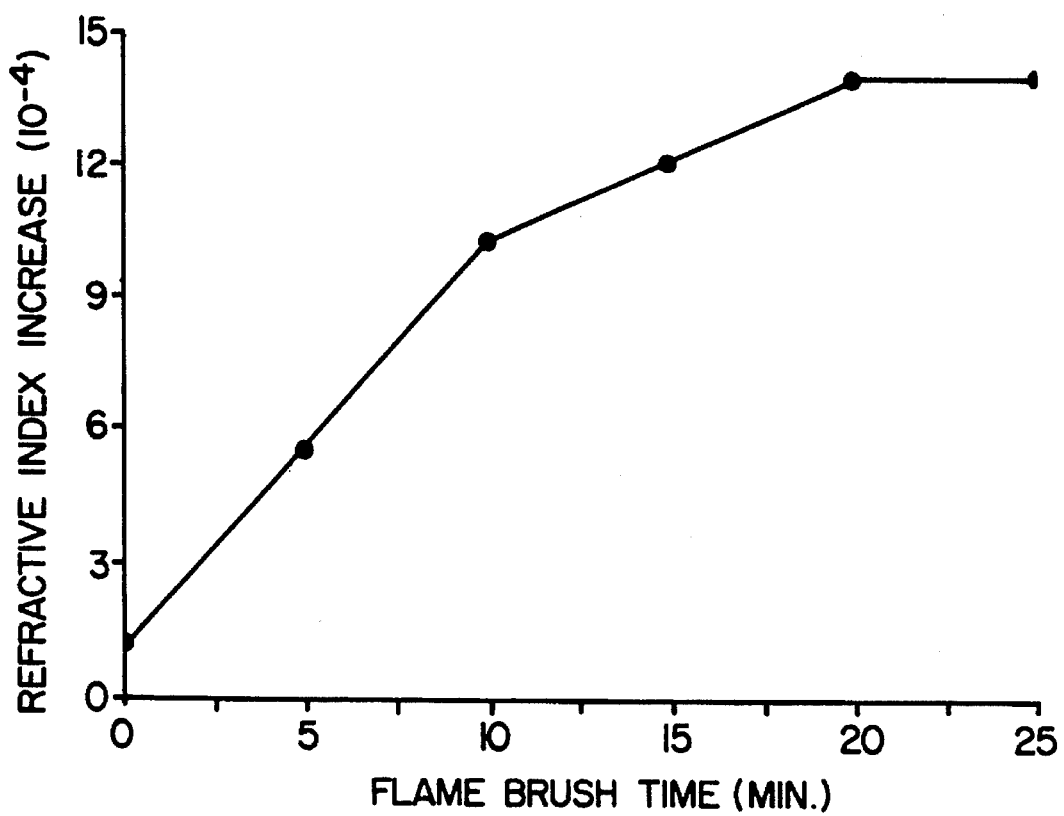

FIG. 2 is a plot of the maximum (saturated) photoinduced index change observed in Corning SMF-28 fiber as a function of processing time under the flame brush. The UV light exposure conditions used were: $\lambda$=249 nm, fluence=300 mj/cm$^2$/per pulse, pulse repetition frequency (PRF)=50 Hz, exposure time=15 min and pulse duration=12 nsec. In a fiber sample that is not flame brushed we observed a photoinduced index change of only $1.2 \times 10^{-4}$; after 20 minutes of flame brush processing, the photoinduced refractive index change that was observed in a similar fiber sample peaked at $1.4 \times 10^{-3}$.

We found that the flame brush method also rendered strongly photosensitive the waveguide core of our samples of high quality Ge:SiO$_2$-on-Si three-dimensional waveguides and of Ge:SiO$_2$-on-SiO$_2$ two-dimensional planar waveguides that were negligibly photosensitive prior to treatment. Experimentally, we observed a larger photosensitization effect in these planar waveguides than we did in the SMF-28 fiber: the photoinduced refractive index change in the waveguide core of unprocessed planar waveguides was below our detection threshold, but with a flame brush treatment became larger than the photoinduced refractive index change in similarly flame brushed SMF-28 fiber for the same UV exposure conditions.

The planar slab film waveguides were fabricated by flame hydrolysis deposition of Ge-doped SiO$_2$ on a silica substrate. The index step, $\Delta n$, of the 5 µm thick Ge-doped layer on the SiO$_2$ was measured at a wavelength $\lambda$=633 nm to be $1.14 \pm 0.04 \times 10^{-2}$ prior to treatment and increased to $1.32 \pm 0.04 \times 10^{-2}$ after 10 minutes of flame brush treatment. Associated with this change in refractive index was an increase in the absorption coefficient of the waveguide core in the ultraviolet spectral region.

Figure 3:
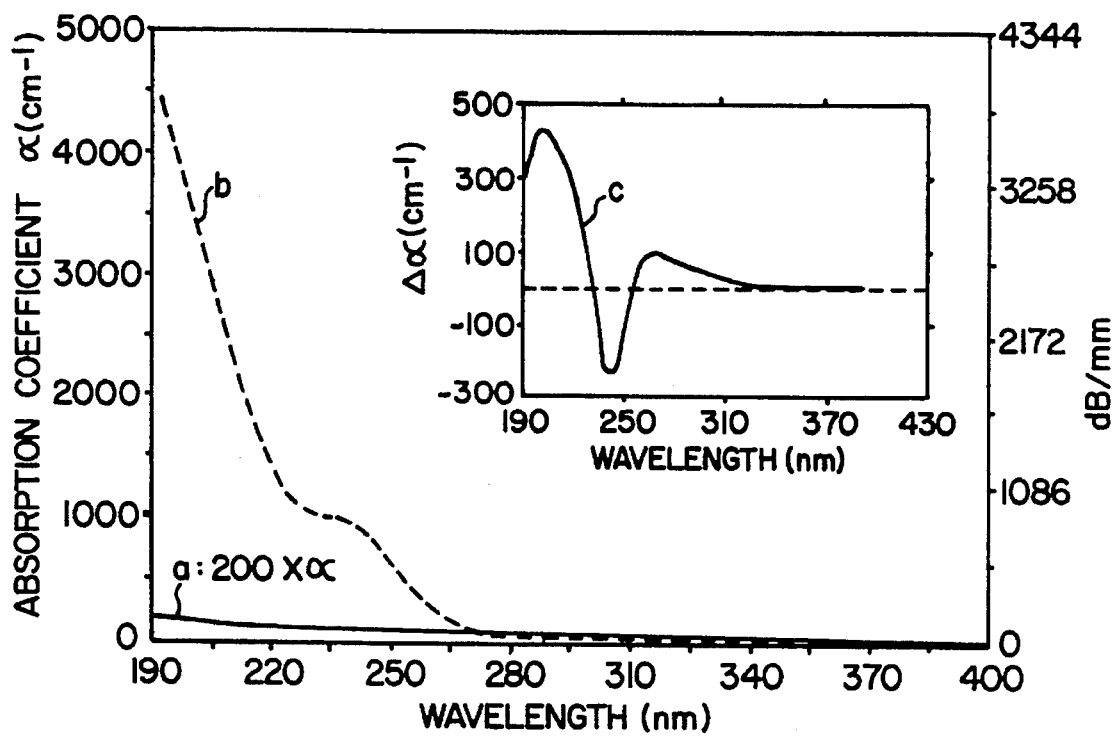

Curve (a) of FIG. 3 illustrates the dispersion in absorption coefficient (multiplied by 200) of the waveguide layer measured normal to the substrate prior to flame brush treatment.

Curve (b) illustrates the dispersion in absorption coefficient for the waveguide layer measured after flame brush treatment. The enormous increase in UV absorption of the waveguide layer that results from flame brush treatment is apparent: approximately 1000 dB/mm at 240 nm. Kramers-Kronig causality predicts that an increase in absorption at short wavelengths causes an increase in refractive index at long wavelengths, as observed.

Curve (c) illustrates an experimental measurement of $\Delta \alpha$, the photoinduced change in the dispersion of the absorption coefficient for the flame photosensitized waveguide layer, caused by 249 nm UV light irradiation for 40 minutes with fluence per pulse of 112 mJ/cm$^2$ at 50 Hz PRF. The effect of the irradiation is to bleach out the absorption at 240 nm and simultaneously to increase it on both sides of the band (at 213 nm and at 281 nm). The result is that UV irradiation increases the net UV absorption of the sample and thus concomitantly increases, as observed, the refractive index at longer wavelengths.

For comparison, we measured the change in absorption due to flame brush treatment of a homogeneous silica substrate. The substrate was identical to that which we used for the flame hydrolysis deposition of the Ge:SiO$_2$ planar optical waveguide described above. The absorption of the substrate was basically unaffected by the processing (less than 2% change in absorption at 240 nm). Therefore we attribute the increase in absorption in samples processed by flame brush entirely to the effect of processing on the optical properties of the Ge:SiO$_2$ waveguide layer.

We postulate on this evidence that flame brushing of a waveguide affects preferentially the optical properties of the Ge-doped silica core and leaves unaffected the properties of the cladding. In this sense it is an ideal photosensitization process because the cladding can remain transparent, thereby enabling the activating light to reach the core of the waveguide unattenuated. At the same time, processing creates in the Ge-doped core very strong absorption, rendering the core highly photosensitive so that UV light can affect the change in its refractive index.

For reasons of flexibility, grating devices are usually written in a photosensitive waveguide by illuminating the waveguide from the side with UV light. Typically, the optical waveguide core is surrounded by cladding material several times the transverse dimension of the core. For successful side-writing not only must the activating UV light be transmitted by the cladding, but it must also be absorbed sufficiently by the core to enable the light to photoinduce efficiently an index change there. Therefore, because the transverse dimensions of an optical waveguide are the order of only a few microns, as a primary requirement for high photosensitivity, the absorption due to the presence of the core dopant must be as large as possible. Flame brushing has been found to create these advantageous conditions for effective side-writing.

Figure 5:
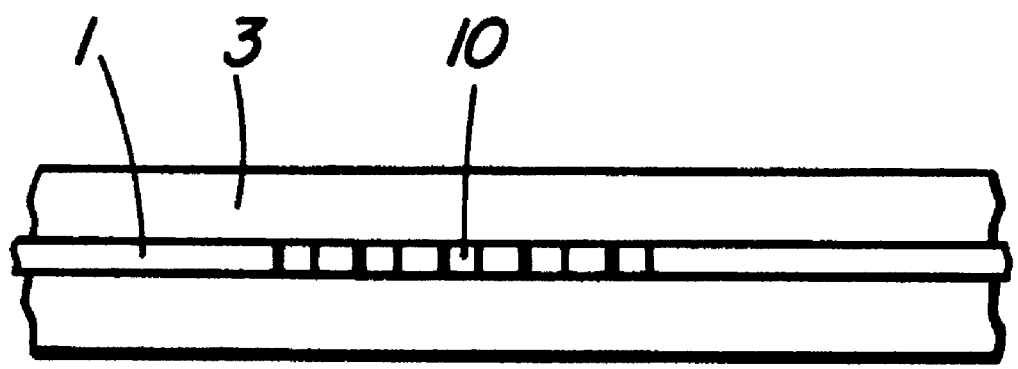
Figure 6:
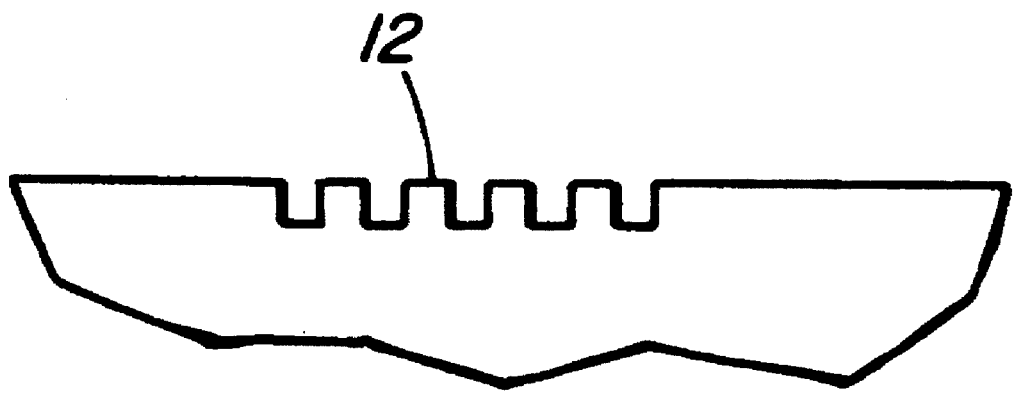

In optical waveguides photosensitized by our method we have written strong Bragg gratings 10 as shown in FIG. 5 in three-dimensional planar and optical fiber waveguides, with KrF (249 nm) radiation incident on the samples through a zero-order-nulled photolithographic grating phase mask 12 as shown in FIG. 6 patterned with a pitch required for optical waveguide Bragg resonance at about 1540 nm.

Figure 4:
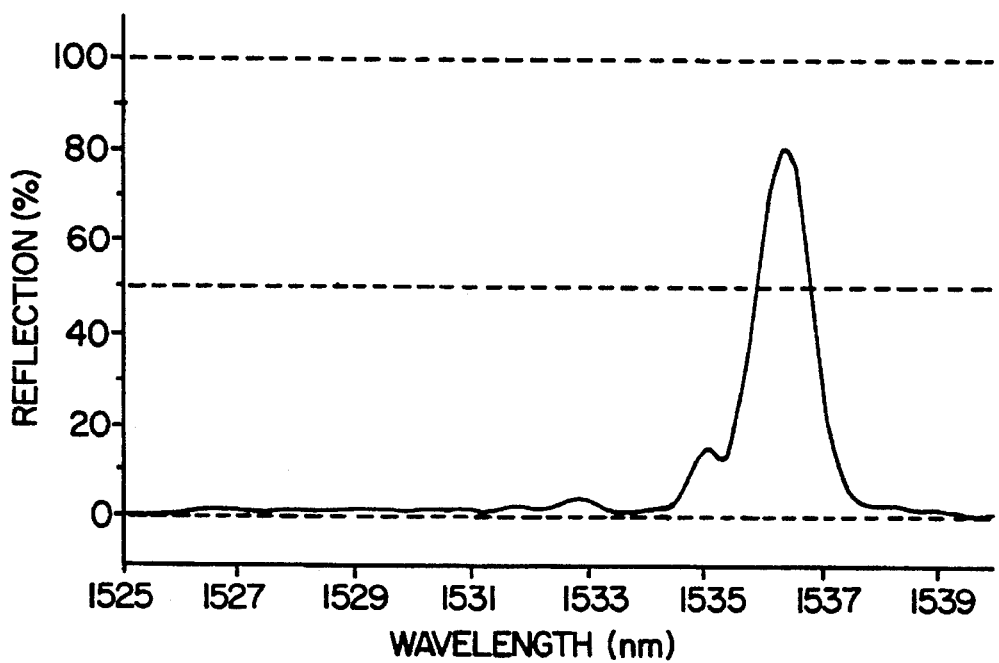

FIG. 4 illustrates the measured wavelength response of a 1 mm long Ge:SiO$_2$-on-Si planar waveguide Bragg grating. The 81% reflectivity corresponds to a core refractive index modulation amplitude of $8.9 \times 10^{-4}$ for each of the two principal polarization states. To write the Bragg grating, the waveguide was photosensitized by 10 minutes of flame brush processing prior to irradiation by a KrF excimer laser beam which was incident on the waveguide at 50 PRF for 15 minutes through the photolithographic grating phase mask.

The writing of Bragg gratings is very useful for characterizing the photosensitive response of optical waveguides. Both the average change in index with exposure and the corresponding depth of modulation of the index can be monitored. The shift of the Bragg resonance wavelength as a function of photolithographic exposure dose to UV light provides a measure in real time of the average change in the refractive index caused by the exposure. The strength of the Bragg resonance yields the depth of the photoinduced spatial modulation. With phase mask photolithography on fiber, the ratio of the modulation to the average index change that we attained consistently was about 0.4. At the high fluence per pulse levels needed to write the in-core Bragg grating, we wrote simultaneously a high quality surface relief grating at the silicon-silica interface which we attributed to light-induced melting of the silicon, together with stress relaxation at the interface.

We carried out temperature stability measurements on the photoinduced Bragg grating whose response is shown in FIG. 4. After the sample was held at 500° C. for 17 hours, the refractive index modulation stabilized at $3.6 \times 10^{-4}$, representing a decrease of 40% of its original value.

Photosensitized waveguide could simplify single pulse writing of in-fiber Bragg gratings and yield useful sensor devices.

The present invention provides an effective method for photosensitizing optical waveguides with high spatial selectively (only the selected portion of the waveguide need be photosensitized) and for fabricating efficient Bragg gratings in at least $Ge:SiO_2$-on-Si and Ge-doped core optical fiber waveguides.

Localized heating with a flame has been found to be a simple and effective method for augmenting substantially the photosensitivity of high silica optical waveguides to ultraviolet light. The method increases the photosensitivity of standard (Ge-doped core) telecommunications fiber by a factor greater than ten (photoinduced $\Delta n > 10^{-3}$) and renders strongly photosensitive high quality $Ge:SiO_2$-on-Si $Ge:SiO_2$-on-$SiO_2$ and $Ge:SiO_2$-on-$Al_2O_3$ planar waveguides that were negligibly photosensitive prior to treatment. Using waveguides photosensitized by the present invention strong Bragg gratings have been written in fiber and planar optical waveguide, with KrF (249 nm) radiation incident on the waveguides through a zero-order-nulled phase mask. It is noteworthy that photosensitization by our method is achieved with a negligible increase in loss at the three principal optical communication windows.

While the above-described flame brushing method is described as preferably using a flame fueled by a fuel such as hydrogen or propane, but to which a small amount of oxygen is sometimes added, it has been found that an improvement is achieved using a flame fueled by deuterium rather than with hydrogen. It is found that the resulting photosensitized optical waveguide has lower losses than a hydrogen fueled flame brushed optical waveguide at the wavelength of about 1550 nm, and at other wavelengths of interest in optical communications and in sensing applications.

It has also been found that the method described in this specification will render a weakly photosensitive waveguide strongly photosensitive where the waveguide is comprised of silica doped with phosphorous. Bragg gratings, for example, can be made with optical fibers having a phosphorous doped core, photosensitized using either flame brushing or hydrogen loading and irradiated with actinic radiation of, for example, 193 nm, which can be produced with an XCIMER laser. The cladding of the optical fiber or other waveguide should be essentially transparent to the actinic radiation.

In accordance with another embodiment of the invention, instead of flame brushing the weakly photosensitive optical waveguide, it should be placed in a plasma, wherein the plasma is generated in hydrogen or deuterium gas. The plasma maintains the waveguide at a lower temperature than the temperature experienced locally in a brushing flame, which advantageously reduces the likelihood of diffusion of dopant during the photosensitized process.

It should be noted that the invention is applicable to various optical waveguides, such as planar or channel waveguides, and is not restricted to optical fiber waveguides.

A person understanding this invention may now conceive of alternative structures and embodiments or variations of the above. All of those which fall within the scope of the claims appended hereto are considered to be part of the present invention.

We claim:

1. A method of fabricating a strongly photosensitive optical waveguide comprising locally heating while maintaining the structural integrity of a portion of a weakly photosensitive optical waveguide to an approximately white hot temperature for a period of time sufficient to increase the concentration of defects associated with photosensitivity in the heated portion of said waveguide.

2. A method as defined in claim 1 in which the waveguide is an optical fiber.

3. A method as defined in claim 2 in which said weakly photosensitive waveguide is comprised of one of $Ge:SiO_2$ on a Si substrate, $Ge:SiO_2$ on a $SiO_2$ substrate, and $Ge:SiO_2$ on a $Al_2O_3$ substrate.

4. A method as defined in claim 2 in which said weakly photosensitive waveguide is comprised of silica doped with one of germanium, cerium and europium.

5. A method as defined in claim 4, wherein the waveguide is codoped with alumina.

6. A method as defined in claim 2, wherein the waveguide is codoped with alumina.

7. A method as defined in claim 1 in which the waveguide is a planar waveguide.

8. A method as defined in claim 7 in which said weakly photosensitive waveguide is comprised of one of germanium doped silica or a silicon, silica and sapphire substrate material.

9. A method as defined in claim 7, including the initial steps of fabricating the planar waveguide by flame hydrolysis of Ge doped $SiO_2$ on a silica substrate to form a layer approximately 5 μm thick.

10. A method as defined in claim 7 in which said weakly photosensitive waveguide is comprised of silica doped with one of germanium, cerium and europium.

11. A method as defined in claim 10, wherein the waveguide is codoped with alumina.

12. A method as defined in claim 1 in which said defects are oxygen deficiency defects.

13. A method as defined in claim 1 in which said waveguide is fabricated strongly photosensitive to wavelengths of approximately 248 nm.

14. A method as defined in claim 1 in which the weakly photosensitive optical waveguide local heating is conducted by moving a local heating source along said waveguide to increase a size of a region containing said defects.

15. A method as defined in claim 1 in which the local heating source is a flame, used to brush the optical waveguide, the flame being fueled by a gas.

16. A method as defined in claim 15 in which the temperature of the flame is approximately 1700° C.

17. A method as defined in claim 16 in which the flame brushing is continued for approximately 10–20 minutes.

18. A method as defined in claim 15 in which oxygen is added to the gas.

19. A method as defined in claim 1 in which said weakly photosensitive waveguide is comprised of silica doped with one of germanium, cerium and europium.

20. A method as defined in claim 19, wherein the waveguide is codoped with alumina.

21. A method as defined in claim 1 including the further steps of creating at least one of a Bragg and surface relief grating comprising positioning a grating phase mask at the side of the strongly photosensitized portion of the waveguide with its plane parallel to the axis of the waveguide, and irradiating said strongly photosensitized portion of the waveguide through the phase mask with monochromatic light at a wavelength at which said waveguide is strongly photosensitive.

22. A method as defined in claim 1 in which said weakly photosensitive waveguide is comprised of silica doped with one of germanium, cerium, europium and phosphorous.

23. A method as defined in claim 22 in which the waveguide is one of an optical fiber, a channel and at least part of a planar layer.

24. A method as described in claim 1, in which the heating step is comprised of placing the weakly photosensitive optical waveguide in a flame fueled by hydrogen or deuterium.

25. A method of fabricating a strongly photosensitive waveguide comprising heating a weakly photosensitive optical waveguide to an approximately white hot temperature in a high pressure plasma of hydrogen or deuterium gas for a period of time sufficient to increase the concentration of defects associated with photosensitivity in the heated waveguide.

26. A method of photosensitization comprising locally heating while maintaining the structural integrity of at least a portion of a weakly photosensitive silica optical waveguide doped with phosphorous to an approximately white hot temperature for a period of time sufficient to increase the concentration of defects associated with photosensitivity in the heated portion of the waveguide and irradiating said heated portion with actinic radiation in order to cause a refractive index change in the waveguide.

27. A method as defined in claim 26 in which a waveguide core is covered by a cladding essentially transparent to active radiation, and passing said radiation through the cladding to the waveguide core.

28. A method as defined in claim 27 in which the heating step is comprised of retaining said weakly sensitive waveguide in a plasma fueled by hydrogen or deuterium.

29. A method as defined in claim 26 in which the waveguide core is codoped with a laser active dopant such as erbium.

* * * * *